Patented Feb. 26, 1946

2,395,713

UNITED STATES PATENT OFFICE 2,395,713

PRODUCTION OF ALKALINE EARTH METAL SULPHONATES

Carroll B. Barbour, Yeadon, Pa., assignor to The Atlantic Refining Company, Philadelphia, Pa., a corporation of Pennsylvania No Drawing. Application August 10, 1944, Serial No. 548,945

11 Claims. (Cl. 260—504)

The present invention relates to the production of hydrocarbon oil solutions of alkaline earth metal sulphonates, and more particularly to the preparation and purification of compositions comprising a viscous hydrocarbon oil solution of calcium sulphonate.

An object of this invention is the production of relatively low viscosity or fluid solutions of calcium sulphonate in viscous mineral oil, such solutions being characterized by their improved stability as regards color and acidity, and their ability to function as lubricants, components of lubricants, or rust proofing agents. Such compositions are of particular utility as lubricants for internal combustion engines, since they function not only as anti-rust agents but also as detergents for maintaining engine cleanliness.

It has been proposed heretofore to incorporate by various methods "detergents" such as calcium petroleum sulphonate in lubricating oil designed for use in internal combustion engines. In one procedure, oil-soluble sodium sulphonates derived as a by-product in the manufacture of mineral white oil were transposed to calcium sulphonate by treatment with reactive calcium compounds, and the resulting calcium sulphonate was then admixed with lubricating oil. In another procedure, oil-soluble sulphonic acids were isolated from sulphuric acid treated hydrocarbon oil, and the free sulphonic acids in substantially pure condition were added to the lubricating oil and thereafter neutralized with a basic calcium compound to produce calcium sulphonate in the oil. In a third procedure, the hydrocarbon stock was subjected to sulphonation, and after removal of sludge, the resulting hydrocarbon solution of sulphonic acids was neutralized with an aqueous slurry or suspension of hydrated lime. All these methods have been open to objection as involving either unnecessary and uneconomical steps such as the isolation of the free sulphonic acids or their sodium salts and their subsequent transposition to calcium sulphonates, or as in the case of the third procedure mentioned, the difficulties encountered in the formation of emulsions which rendered the method impracticable in commercial operations.

A recently proposed method for the production of oil solutions of calcium sulphonate which obviates the difficulties respecting the formation of emulsions resides in the neutralization of the sulphonated hydrocarbon oil with substantially dry lime. However, while this method avoids troublesome emulsions, the purification of the calcium sulphonate oil solution is rendered difficult due to the high viscosity of the solution and the gelatinous nature of the calcium sulphonate contained in the oil. During the neutralization of the sulphonated oil, it is necessary to employ lime in a quantity slightly in excess of that required to completely neutralize the oil-soluble sulphonic acids. The resulting oil therefore contains not only the oil-soluble calcium sulphonate, but also unreacted lime, calcium sulphate, and other undesirable solid materials. In most cases, due to the concentration of the calcium sulphonate and its gelatinous nature, the viscosity of the oil is too high to permit substantial removal of the solid materials by filtration, except at relatively high temperatures. High temperature filtration causes discoloration of the oil solutions, which adversely affects their salability. Furthermore, due to the high viscosity, the product must be stored at about 250° F. to be pumpable, and such storage at this temperature results in deterioration, particularly in color. Additionally, the product is difficult to unload from tank cars, causing considerable complaint from purchasers.

I have found that these difficulties may be obviated and that alkaline earth metal sulphonates, particularly calcium petroleum sulphonate may be formed directly in the lubricating oil by neutralizing the sulphonic acids produced therein by a sulphonation treatment, in the presence of an alkaline earth metal halide, particularly calcium chloride, as is more fully set forth hereinafter, the resulting oil solution being characterized by its fluidity and ease of handling.

In accordance with my invention, a suitable hydrocarbon oil stock, preferably of the type used in the manufacture of mineral white oil, is subjected to sulphonation by contacting with a sulphonating agent such as fuming sulphuric acid in an amount equivalent to 15% to 50% by volume of the oil. The acid is applied in a plurality of dumps, usually 5% by volume each, and the sludge is settled and separated between each dump. The sulphonation is carried out at a temperature between 100° F. and 150° F., the temperature preferably being maintained at about 130° F. Upon completion of the sulphonation and removal of acid sludge, there is added to the sour oil containing the oil-soluble sulphonic acids, powdered lime in an amount in excess of that required to neutralize the oil. There is likewise added to the sour oil a small amount of water, for example, 5% to 15% by volume of the oil, and a small quantity of calcium chloride preferably in the form of a concentrated aqueous solution, for example, 40% $CaCl_2$ in water, the quantity of solution varying depending upon its concentration. Using a 40% solution, from 0.25% to 2.0% by volume has been found suitable, 1.25% to 1.5% by volume being preferred. The concentration of the solution may vary over a wide range, although a 40% solution is preferred since it is commercially available in that strength. It is of course desirable to employ the minimum amount of calcium chloride necessary to produce the desired results, and amounts greater than 2% by volume of 40% concentration may be used without adverse effect, although such practice is uneconomical. Using more dilute solutions will necessarily require an increase in volume, care being taken to maintain the total volume of water in the reaction mixture substantially between the limits of 5% to 15% by volume of the oil, when the calcium chloride is applied during the neutralization. When the calcium chloride is applied after the neutralization. the amount of water present is of less consequence.

The mixture of sour oil containing oil-soluble sulphonates, lime, water, and calcium chloride is then heated with open steam to a temperature of 160° F. to 180° F. to effect neutralization, the time required usually ranging from ½ hour to 2 hours. The mixture is then circulated through a heating device and the temperature is maintained between 160° F. and 230° F., and preferably at 210° F.–220° F. while air is blown through mixture to remove the water and brighten the oil. In this manner neutralization and dehydration of the oil is accomplished without the formation of emulsions or gels, and there is obtained a relatively low viscosity solution of oil containing, for example, 10% to 12% of oil-soluble calcium sulphonate, unreacted lime, calcium sulphate, and calcium chloride, the latter being for the most part adsorbed upon the line and calcium sulphate. To this mixture is added a small amount of a filter aid, for example, 0.5% to 5% of "Hyflow-Super-Cel," and the mixture is filtered at a temperature between 200° F. and 250° F. and preferably at 230° F.–240° F. to remove the insoluble calcium compounds such as unreacted lime, calcium chloride, and calcium sulphate. The filtered oil solution of calcium sulphonate, at this stage, usually has a Saybolt Universal viscosity at 210° F. of the order of 50 to 100 seconds, compared with a viscosity of 200 seconds or more for calcium sulphonate oil solutions prepared in the absence of calcium chloride. In order to increase the content of calcium sulphonate in the oil, the solution after the filtration step may be subjected to distillation under reduced pressure to remove at least a portion of the oil content. The resulting oil, after such concentration procedure, may contain of the order of 20% to 40% by weight of calcium sulphonate. This concentrate may be employed as a base material for blending with lubricating oil of desired viscosity in order to incorporate in the oil the desired amount of calcium sulphonate to function as a "detergent." In the event that it is not desired to remove at least a portion of the oil from the calcium sulphonate oil solution, the distillation step may be eliminated, and the oil may be utilized directly as a lubricant, with or without the addition of other agents such as antioxidants, corrosion inhibitors, film strength agents, and the like.

In the method above described, the addition of dry lime to the sour oil was followed immediately by the addition of a small amount of water and calcium chloride solution. This procedure may be varied, in that after the addition of the lime, the mixture of sour oil and lime may be vigorously agitated by mechanical means or by air blowing, in order to wet the lime with the oil prior to the addition of the water and calcium chloride solution. Furthermore, satisfactory results may be obtained insofar as reduction of viscosity of the oil solution of calcium sulphonate is concerned, by carrying out the lime neutralization and then adding the calcium chloride solution near or at the end of the neutralization. When the calcium chloride solution is added after neutralization, the entire mixture should be steamed with open steam or air blown at an elevated temperature to insure dispersion or adequate contacting of the calcium chloride with the oil-lime-water mixture.

My invention may be further illustrated by the following examples, which, however, are not to be construed as limiting the scope thereof.

|  | Untreated distillate | Nitrobenzene extract of lub oil distillate | | Nitrobenzene extract of lub oil distillate | |
|---|---|---|---|---|---|
| Oil stock: | | | | | |
| S. U. vis./100° F | 850 | 580 | | 550 | |
| A. P. I. gravity.........degrees.. | 21 | 18.2 | | 18.4 | |
| Sulphonation: | | | | | |
| Sulphuric acid | Fuming | 98% | 98% | 98% | 98%. |
| Vol. percent | 20 | 20 | 20 | 20 | 20. |
| Dumps, 5% each | 4 | 4 | 4 | 4 | 4. |
| Temp., °F | 130 | 130–170 | 130–170 | 120–170 | 120–170. |
| Sour oil: | | | | | |
| Percent yield | 70.0 | 66.1 | 66.1 | 65 | 65. |
| Neut. No | 18.7 | 19.3 | 19.3 | 13.7 | 13.7. |
| Neutralization: | | | | | |
| Lime, percent theoretical | 174 | 94.5 | 94.5 | 110 | 110. |
| Water, vol. perent | 11 | 8 | 8 | 7 | 7. |
| 40% CaCl₂ soln., vol. percent | 1.5 | 1.0 | None | 1.0 | None. |
| Steamed | 165° F | 190° F | 190° F | None | Do. |
| Air blown | 230° F | 218° F | 218° F | 250° F | 250° F. |
| Filtered oil: | | | | | |
| A. P. I. gravity | 22.0° | 18.4° | 18.7° | 18.8° | 19.1°. |
| Viscosity/210 F. (S. U.) | 69 | 97 | 200 | 87 | 201. |
| Neut. No. (acid) | 2.4 ¹ | 0.35 | 0.30 | 0.27 | 0.25. |
| Vacuum distillation: | | | | | |
| Vol. percent bottoms | 35 | 51 | 46 | 45.6 | 38.5. |
| A. P. I. gravity | 12 | 13.0° | 12.8° | 14.8° | |
| Viscosity/210° F. (S. U.) | 310 | 1058 | 3494 ¹ | 228 | Solid. |
| Neut. No. (acid) | 5.5 ¹ | 0.8 | 1.25 | 0.7 | 0.95. |
| Percent calcium sulphonate | 30.0 | 34.3 | 31.1 | 31.0 | 29.2. |
| Remarks | ¹ Alkaline. | CaCl₂ soln. added after neut. | | ¹ Furol vis | CaCl₂ soln. added during neut. |

My process is applicable in the production of sulphonic acids or sulphonates from a variety of oils, including viscous straight run distillates, naphthenic oil fractions obtained by selective solvent extraction of heavy distillates or lubricating oil stocks, distillate oils from cracking operations or destructive hydrogenation, synthetic oils produced from hydrocarbon gases, and the like. Furthermore, in the sulphonation step I may employ sulphuric acid of 93% to 100% concentration, fuming sulphuric acid, sulphur trioxide, or chlorsulphonic acid at temperatures between 70° F. and 170° F., depending upon the nature of the oil stock and the extent of sulphonation desired.

When it is desired to form sulphonates of the alkaline earth metals other than calcium, I may employ the basic compounds of strontium, barium, and magnesium, preferably the oxides or hydroxides, in conjunction with the corresponding halides of these metals, utilizing the technique described hereinbefore. In effecting the neutralization, the alkaline earth metal oxide or hydroxide may be added to the oil in a dry state, dispersed in the oil by suitable means, and a small amount of water then added, and the mixture steamed or blown with air at elevated temperature. Alternatively, the alkaline earth metal oxide or hydroxide may be applied to the oil in the form of an aqueous slurry containing sufficient water to give the desired total water content, and the mixture then steamed or air blown at elevated temperature. The alkaline earth metal chloride, preferably in the form of concentrated solution, may be added to the oil prior to, during, or subsequent to the neutralization step.

Herein, and in the appended claims, the term "lime" comprehends calcium oxide (CaO) and calcium hydroxide (Ca(OH)$_2$), and the term "alkaline earth metal oxide" comprehends the oxides and hydroxides of the alkaline earth metals.

I claim:

1. The method of producing a hydrocarbon oil solution of an alkaline earth metal sulphonate, which comprises sulphonating a viscous hydrocarbon oil, separating spent sulphonating agent and sludge from the sulphonated oil, the neutralizing the sulphonated oil with an alkaline earth metal oxide in the presence of a small quantity of an alkaline earth metal chloride sufficient to maintain the oil in a fluid condition.

2. The method of producing a hydrocarbon oil solution of an alkaline earth metal sulphonate, which comprises sulphonating a viscous hydrocarbon oil, separating spent sulphonating agent and sludge from the sulphonated oil, neutralizing the sulphonated oil with an alkaline earth metal oxide in the presence of a small quantity of an alkaline earth metal chloride sufficient to maintain the oil in a fluid condition, and separating from the neutralized oil containing oil-soluble alkaline earth metal sulphonate, insoluble alkaline earth metal compounds.

3. The method of producing a hydrocarbon oil solution of an alkaline earth metal sulphonate, which comprises sulphonating a viscous hydrocarbon oil, separating spent sulphonating agent and sludge from the sulphonated oil, neutralizing the sulphonated oil with an alkaline earth metal oxide in the presence of a small quantity of an alkaline earth metal chloride sufficient to maintain the oil in a fluid condition, separating from the neutralized oil containing oil-soluble alkaline earth metal sulphonate, insoluble alkaline earth metal compounds, and distilling at least a portion of the oil from the oil solution of the sulphonate.

4. The method of producing a hydrocarbon oil solution of an alkaline earth metal sulphonate, which comprises sulphonating a viscous hydrocarbon oil, separating spent sulphonating agent and sludge from the sulphonated oil, adding alkaline earth metal oxide, in an amount in excess of that required for neutralization and a small amount of water and a small quantity of alkaline earth metal chloride sufficient to maintain the oil in a fluid condition, heating the resulting mixture, blowing the heated mixture to accelerate neutralization and to remove water, and separating from the neutralized oil containing oil-soluble alkaline earth metal sulphonate, insoluble earth metal compounds.

5. The method of producing a hydrocarbon oil solution of calcium sulphonate, which comprises sulphonating a viscous hydrocarbon oil, separating spent sulphonating agent and sludge from the sulphonated oil, and neutralizing the sulphonated oil with calcium oxide in the presence of a small quantity of calcium chloride sufficient to maintain the oil in a fluid condition.

6. The method of producing a hydrocarbon oil solution of calcium sulphonate, which comprises sulphonating a viscous hydrocarbon oil, separating spent sulphonating agent and sludge from the sulphonated oil, and neutralizing the sulphonated oil with calcium oxide in the presence of a small quantity of calcium chloride sufficient to maintain the oil in a fluid condition, and separating from the neutralized oil containing oil-soluble calcium sulphonate, insoluble calcium compounds.

7. The method of producing a hydrocarbon oil solution of calcium sulphonate, which comprises sulphonating a viscous hydrocarbon oil, separating spent sulphonating agent and sludge from the sulphonated oil, neutralizing the sulphonated oil with calcium oxide in the presence of a small quantity of calcium chloride sufficient to maintain the oil in a fluid condition, separating from the neutralized oil containing oil-soluble calcium sulphonate, insoluble calcium compounds, and distilling at least a portion of the oil from the oil solution of the sulphonate.

8. The method of producing a hydrocarbon oil solution of calcium sulphonate, which comprises sulphonating a viscous hydrocarbon oil, separating spent sulphonating agent and sludge from the sulphonated oil, adding calcium oxide in an amount in excess of that required for neutralization and a small amount of water and a small quantity of calcium chloride sufficient to maintain the oil in a fluid condition, heating the resulting mixture, blowing the heated mixture to accelerate neutralization and to remove water, and separating from the neutralized oil containing oil-soluble calcium sulphonate, insoluble calcium compounds.

9. The method of producing a hydrocarbon oil solution of calcium sulphonate, which comprises sulphonating a viscous hydrocarbon oil, separating spent sulphonating agent and sludge from the sulphonated oil, adding calcium oxide in an amount in excess of that required for neutralization and from 5% to 15% by volume of water and from 1% to 2% by volume of a concentrated calcium chloride solution, heating the resulting mixture, blowing the heated mixture to accelerate neutralization and to remove water, and separating from the neutralized oil containing oil-soluble calcium sulphonate, insoluble calcium compounds.

10. In a method for producing a hydrocarbon oil solution of an alkaline earth metal sulphonate by neutralizing a viscous hydrocarbon oil solution of oil-soluble sulphonic acids with an alkaline earth metal oxide, the step which comprises incorporating in the neutralization reaction mixture, a small quantity of an alkaline earth metal chloride sufficient to maintain the oil containing the alkaline earth metal sulphonate in a fluid condition.

11. In a method for producing a hydrocarbon oil solution of calcium sulphonate by neutralizing a viscous hydrocarbon oil solution of oil-soluble sulphonic acids with calcium oxide, the step which comprises incorporating in the neutralization reaction mixture, a small quantity of calcium chloride sufficient to maintain the oil containing the calcium sulphonate in a fluid condition.

CARROLL B. BARBOUR.

Certificate of Correction

Patent No. 2,395,713.  February 26, 1946.

CARROLL B. BARBOUR

It is hereby certified that errors appear in the printed specification of the above numbered patent requiring correction as follows: Page 2, first column, line 30, for "line" read *lime*; same page, in the table, first column thereof, under the heading "Neutralization" for "Water, vol. perent" read *Water, vol. percent*; page 3, first column, line 45, claim 1, for the word "the" second occurrence, read *and*; and that the said Letters Patent should be read with these corrections therein that the same may conform to the record of the case in the Patent Office.

Signed and sealed this 14th day of May, A. D. 1946.

[SEAL]

LESLIE FRAZER,
*First Assistant Commissioner of Patents.* oil solution of an alkaline earth metal sulphonate by neutralizing a viscous hydrocarbon oil solution of oil-soluble sulphonic acids with an alkaline earth metal oxide, the step which comprises incorporating in the neutralization reaction mixture, a small quantity of an alkaline earth metal chloride sufficient to maintain the oil containing the alkaline earth metal sulphonate in a fluid condition.

11. In a method for producing a hydrocarbon oil solution of calcium sulphonate by neutralizing a viscous hydrocarbon oil solution of oil-soluble sulphonic acids with calcium oxide, the step which comprises incorporating in the neutralization reaction mixture, a small quantity of calcium chloride sufficient to maintain the oil containing the calcium sulphonate in a fluid condition.

CARROLL B. BARBOUR.

Certificate of Correction

Patent No. 2,395,713.  February 26, 1946.

CARROLL B. BARBOUR

It is hereby certified that errors appear in the printed specification of the above numbered patent requiring correction as follows: Page 2, first column, line 30, for "line" read *lime*; same page, in the table, first column thereof, under the heading "Neutralization" for "Water, vol. perent" read *Water, vol. percent*; page 3, first column, line 45, claim 1, for the word "the" second occurrence, read *and*; and that the said Letters Patent should be read with these corrections therein that the same may conform to the record of the case in the Patent Office.

Signed and sealed this 14th day of May, A. D. 1946.

[SEAL]

LESLIE FRAZER,
*First Assistant Commissioner of Patents.*